(No Model.)

P. A. H. HÖPPNER & J. M. L. HADDORF.
POT OR PAN.

No. 556,417. Patented Mar. 17, 1896.

Witnesses.
J. J. Bruhn
Th. Grube

Inventors
Peter A. H. Höppner
Johann M. L. Haddorf
per
Robert Krayn
Attorney.

United States Patent Office.

PETER AUGUST HINRICH HÖPPNER AND JOHANN MARTIN LUDWIG HADDORF, OF LUBECK, GERMANY.

POT OR PAN.

SPECIFICATION forming part of Letters Patent No. 556,417, dated March 17, 1896.

Application filed June 16, 1894. Serial No. 514,827. (No model.)

*To all whom it may concern:*

Be it known that we, PETER AUGUST HINRICH HÖPPNER and JOHANN MARTIN LUDWIG HADDORF, residing at Lubeck, Germany, have invented certain new and useful Improvements in Pots or Pans; and we do hereby declare that the following is a full, clear, and exact description of the invention, which will enable others skilled in the art to make and use the same.

This invention has for its object improvements in pots or pans which will render it possible to close such pots or pans almost hermetically, and at the same time allow the lid to be easily put on and taken off. This is shown on the accompanying drawings.

Figure 1:
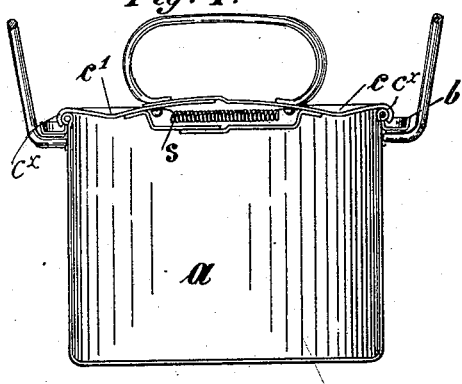
Figure 2:
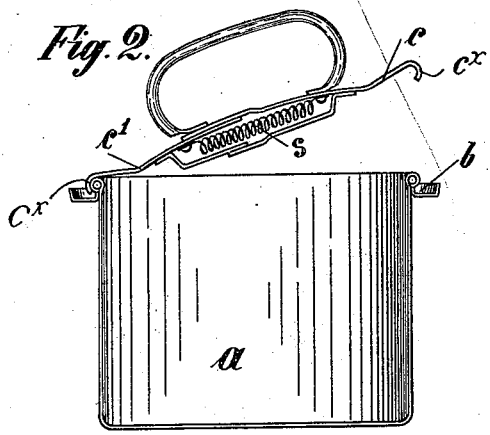
Figure 3:
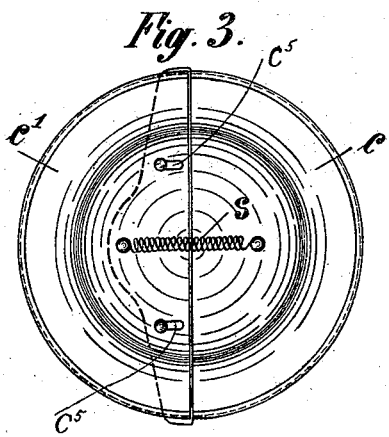

Figure 1 is a cross-section through the pot or pan when the lid is closed; Fig. 2, a cross-section through the same with the lid partly open, and Fig. 3 a top view of the lid.

The pot or pan $a$, of the usual form, is bent over at the upper edge, and has further a gutter or annular receptacle $b$ for receiving the drops formed by the condensation of the water. The lid consists of two halves $c\ c'$, which are held compressed together by means of a suitable spring $s$. At its circumference the lid is curved or bent round to correspond with the upper projecting edge of the pan or pot, as shown at $c^x$, so that the edge of the lid fits tight round that of the pan or pot. One-half of the lid $c$ overlaps the other half $c'$ and thoroughly covers over the interstice formed by the two halves of the lid. In the overlapping portion of the lid guide-pins are situated, which engage with slots in the other half-lid, as shown at $c^5$. The spring which holds the two halves of the lid together is preferably a spiral one, and is surrounded by pieces of tube telescopically adjustable one in the other in order as far as possible to avoid its becoming rusted, and at the same time to prevent corners for dirt being formed in the interior of the lid.

If it be desired to fix the lid on the pot or pan, it is only necessary to engage one half over the upper edge of the pot or pan (see Fig. 2) and then to extend or draw out the other half of the lid, and when so extended to press it down on the pot. If the hold on the half-lid be then released, both halves of the lid will be drawn together by the spring, and thus a tight closing of the pot or pan will be brought about.

The drops of condensed water which are formed are collected by the gutter or annular receptacle $b$ and so prevented from falling from the lid onto the fire-plate or into the fire.

Having now particularly described and ascertained the nature of the said invention and in what manner the same is to be performed, we declare that what we claim is—

A lid or cover for pots or pans consisting in the combination with the sections $c\ c'$ overlapping each other, a sliding connection for said sections, a coiled spring having its opposite ends attached to the sections $c\ c'$ and said sections having their circumferential edges bent over or curved, in the manner described for the purpose specified.

In witness whereof we have hereunto set our hands in presence of two witnesses.

PETER AUGUST HINRICH HÖPPNER.
JOHANN MARTIN LUDWIG HADDORF.

Witnesses:
J. J. BRUHN,
TH. GRUBE.